UNITED STATES PATENT OFFICE.

PETER M. WILSON, OF RALEIGH, NORTH CAROLINA, ASSIGNOR OF THREE-FOURTHS TO COLIN M. HAWKINS AND REED & McGEE, ALL OF SAME PLACE.

TOBACCO PRODUCT.

SPECIFICATION forming part of Letters Patent No. 421,372, dated February 11, 1890.

Application filed February 27, 1889. Serial No. 301,345. (No specimens.)

*To all whom it may concern:*

Be it known that I, PETER M. WILSON, a citizen of the United States, and a resident of Raleigh, in the county of Wake and State of North Carolina, have invented certain new and useful Improvements in Tobacco Products; and I do hereby declare the following to be a full, clear, and exact description of the invention, such as will enable others skilled in the art to which it appertains to make and use the same.

This invention relates to the manufacture of tobacco.

The object is to produce a tobacco product which, while presenting utilization of a waste product, shall be free from any deleterious substance or substances in the nature of adulteration, and shall be tasteful, compact, solid, and of the requisite consistency, and a solid tobacco product consisting of tobacco in leaf or similar form having compacted into the layers of its substance a powder made from the stems or refuse tobacco, all as more fully hereinafter set forth.

Heretofore it has been attempted to utilize the stems in the manufacture of tobacco in various ways, the state of the art being about as follows: It has been sought to utilize the stems by shredding, splitting, or cutting them and mixing them coarsely and loosely with leaf in the manufacture of cigars and smoking-tobaccos. It has also been sought to utilize the stems by providing fibrous material or leaf-tobacco with adhesive substance superficially applied, and dusting a powder made from the stems upon the fibrous material or leaf-tobacco, forming a coating upon the same to provide a wrapper or the like. It has also been sought to utilize the stems by crushing them between pressure-rollers and then mixing them loosely with tobacco. It has also been sought to utilize waste tobacco by coating or preparing thin sheets of fibrous material on one or both surfaces with fine particles of tobacco. It has also been sought to utilize stems by making them into leaves from pulp, darkening the color afterward by spreading upon the sheet formed finely-divided leaf substance pressed in and made to penetrate the surface, the product being a composite tobacco wrapper. It has finally been sought to utilize the stems by softening them in water and reducing them to a pulp, and then rolling the mass into sheets with or without refuse natural leaf, (scrap,) either dry or in form of pulp, incorporated therewith by pressure, or by reducing the stems to pulp, drying the mass, mixing it with finely-divided tobacco-leaves, and pressing the whole together. In no case, however, have the stems been utilized by pulverizing them and distributing their substance finely throughout the manufactured tobacco by distributing it between layers of leaf-tobacco and compacting it into these layers by pressure, thus making of the stems and leaf a solid tobacco product in acceptable condition with the substances well blended.

In some cases in the manufacture of tobacco, to weight the mass or for other purposes, the finished product has been made to contain various foreign substances more or less deleterious. These substances, foreign to the tobacco itself, are to be condemned as adulterants. By the addition of the stem under my procedure a substance is used which is of tobacco itself, and which can be supplied at so small a cost as effectually to displace adulterants. I first take the stems in a sufficiently-dry condition and subject them to a triturating or grinding operation. I prefer to subject them to the mutual attrition incident to the operation of air-grinding in the so-called "cyclone mill." I then take the powder and sprinkle it upon the successive layers of tobacco in the operation of packing or casing it, suitably dampening to insure incorporation and homogeneousness. The dampening may be by any suitable liquor, as by the usual flavoring-liquids. I find it advantageous to employ one ounce of the ground stems to a pound of tobacco, though more or less may be used, as desired.

When the tobacco has been put up with powder made from the stems, as above described, the powder is nearly or quite evenly distributed throughout the mass, and becomes then effectually incorporated with and a part of the tobacco. Though the stem substance was in the form of powder when added to the other tobacco in the course of manufacture, it may now, strictly speaking, have ceased to be a powder.

The product thus made, though of course distinguishable upon inspection, has the general appearance of the best manufactured tobacco, is homogeneous, is of good appearance, and is in taste the same as tobacco made from leaf alone.

No claim is made in this application to the particular method of making the product, since the method forms the subject-matter of another application filed of even date herewith, Serial No. 301,346.

Having thus fully described my invention, what I claim as new, and desire to secure by Letters Patent, is—

A solid tobacco product consisting of tobacco in leaf or similar form having compacted into the layers of its substance a powder made from the stems or refuse tobacco in about the proportions described.

In testimony whereof I affix my signature in presence of two witnesses.

PETER M. WILSON.

Witnesses:
   R. G. DYRENFORTH,
   DAVID H. MEAD.